June 24, 1930.  L. DAMBLANC  1,767,352
CRANK SHAFT
Filed March 26, 1928   2 Sheets-Sheet 2
Fig_3
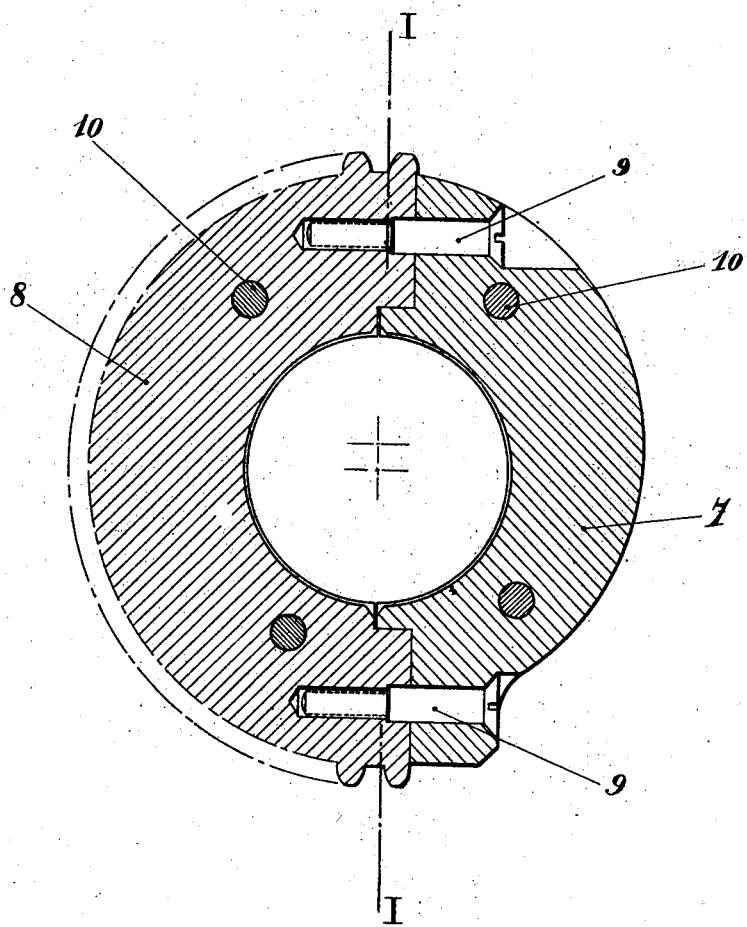

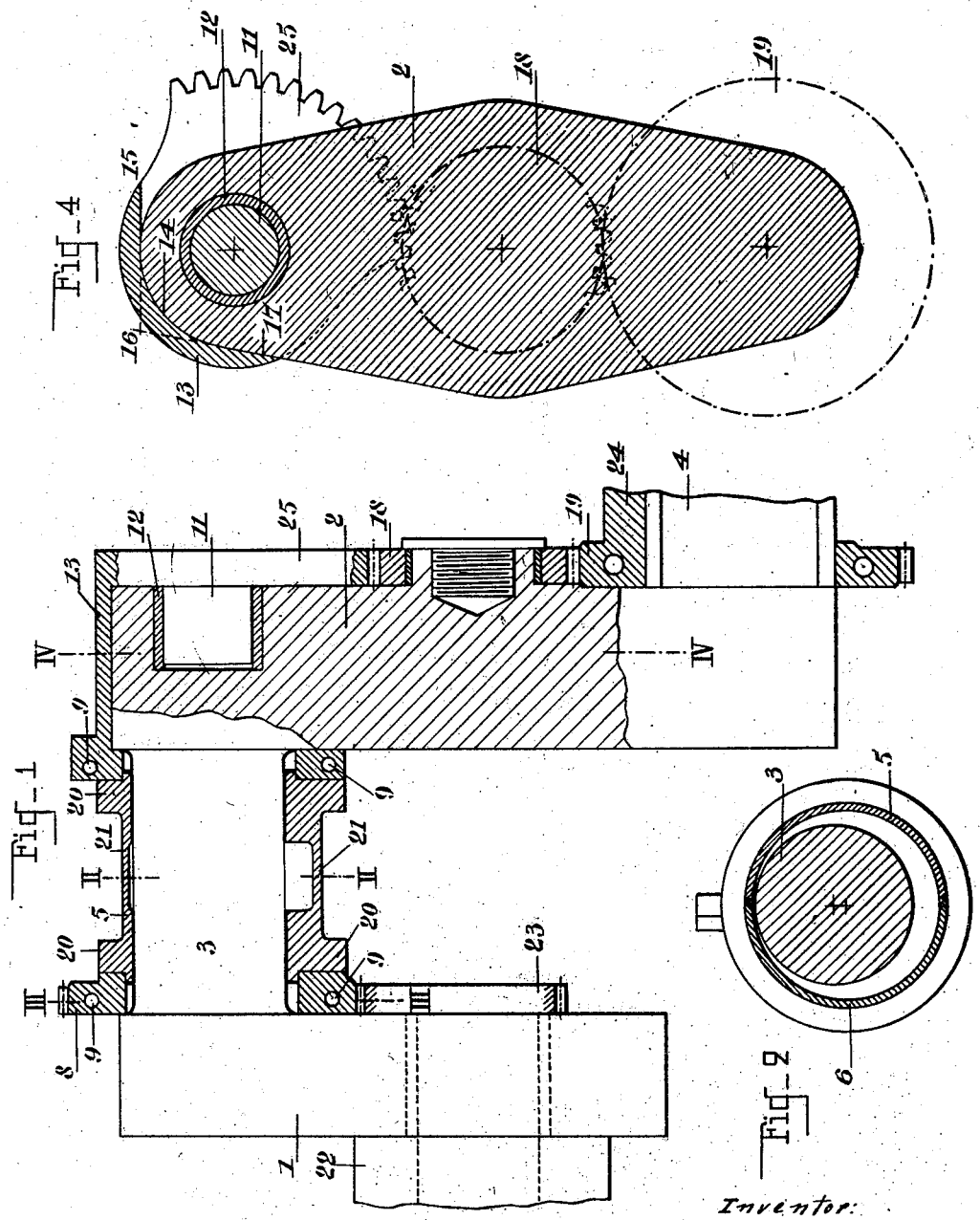

Patented June 24, 1930

1,767,352

UNITED STATES PATENT OFFICE

LOUIS DAMBLANC, OF PARIS, FRANCE

CRANK SHAFT

Application filed March 26, 1928, Serial No. 264,670, and in France March 26, 1927.

My invention relates to machines having pistons joined by connecting rods to the cranks on a crank shaft.

It is known in the art to interpose an eccentric between the crank and the head of the connecting rod. Such an arrangement allows the course of the piston to be varied by displacement of the said eccentric and in this way there is obtained, for example, a variation in the rate of compression in internal combustion engines.

The practical realization of eccentrics, their control elements and their assembly does not present great difficulty in the frequent case of aviation motors where the crank shaft is made of several pieces; but in a number of cases and chiefly in automobile motors consideration of the net cost and simplicity of manufacture necessitate the adoption of crank shafts of a single piece. My invention has precisely for an object, embodiments of eccentrics and their control elements, particularly applicable in the case of crank shafts of a single piece.

According to the invention the eccentrically disposed sleeves are built up of several pieces joined together by suitable means.

Preferably the toothed members carried either by the sleeves themselves or by rings or parts of rings fixed on the said sleeves are of a single piece. They are provided with teeth of an appreciable depth over half their periphery which is sufficient for the proper control of the eccentric.

In order to allow the use of bearings, such as ball-bearings, the sleeve eccentrically disposed is furnished with resting points of sufficient diameter in order that the bearings can be introduced by passing them through the elbows of the crank. Attaching is facilitated by hollowing out the eccentrically disposed sleeve.

The transmission from one eccentric to the following one is realized by means of three toothed wheels or sectors. The first eccentric transmits its movement to a toothed sector situated on the other face of the arm of the crank by means of one or several connecting pieces passing beneath the said arm. The driven eccentric receives its movement from a toothed wheel keyed directly thereon or integral therewith. An intermediate pinion placed on the same face of the arm transmits the movement of the sector to the wheel.

It would be interesting to provide a fixed shaft on the arm for preventing the loose play in the sector of the connecting piece astride the arm.

I may advantageously eliminate the intermediate pinion and give to the sector and the wheel such dimensions that they come directly into engagement.

It is to be understood that the gear trains which have just been spoken of are called sector and wheel for convenience of explanation and that it will suffice in each case that the part furnished with teeth embrace a sector long enough to allow the desired rotation.

By way of example and for facilitating understanding of the description, the accompanying drawing shows an embodiment of the invention in which:

Fig. 1 is an elevational view partly in section of a crank shaft showing the first and part of the second crank;

Fig. 2 is a section on the line 2—2 of Fig. 1;

Fig. 3 is a section on the line 3—3 of Fig. 1; and

Fig. 4 is a section on the line 4—4 of Fig. 1.

The part of the crank shaft represented in Fig. 1 comprises two arms 1 and 2 and two crank pins 3 and 4. On the crank pins are mounted eccentrics consisting of two half-sleeves 5 and 6 (Figs. 1 and 2).

Members 7 and 8 are fastened together by bolts 9 and on the two parts of the eccentric sleeve by means of bolts 10 parallel to the shaft. The two parts 5 and 6 constituting the eccentric are furnished with flanges 20 on which are fitted the ball bearings. The said bearings are provided with ball races of a single piece, for the diameter of the surfaces 20 is large enough that the bearings be put in place by passing above the elbows of the crank arbor. For allowing assembly of the various elements the central part 21 of the sleeve is of a less diameter than that of the flanges 20, so that after having passed the bearings above the elbows of the crank shaft and collected at the middle of the crank pin, then slid in place are the two parts of the eccentric sleeve and then finally the ball bearings are brought to their definite position on the circular flanges 20.

I may proceed in the same way for the toothed rings or a single piece, in the case where it is possible to give them a sufficient diameter.

The general control of the eccentrics is effected by the shaft 22 carrying a pinion 23. The pinion 23 meshes with the sector 8 keyed on the eccentric 5 or made integral therewith.

Movement is transmitted from the eccentric 5 to the eccentric 24 in the following manner:

A toothed sector 25 (Figs. 1 and 2) is provided with a shaft 11 which turns freely in a recess 12 coaxial with the crank pin 3. The sector 25 is fitted to the eccentric 5 by a connecting piece 13 which strides the arm 2. The interior surface of the piece 13 is bored in a way to bear on a suitably rectified portion 14 (Fig. 4) on the periphery of arm 2.

The rotation of the eccentric 5, of the connecting piece 13, and of sector 25 which is rigid therewith is limited by the presence of arm 2. The connecting piece is determined in such a way as to present the desired resistance and to allow an angle of rotation suitable for the operation of the eccentric. This angle represented at 15, 16, 17 (Fig. 4) is about 100° in the embodiment illustrated.

A pinion 18 centered on a boss of arm 2 is in engagement with the sector 25. It drives the toothed wheel 19 rigid with the eccentric 24 which is to be controlled.

It will be noticed that the overall longitudinal dimensions are diminished due to the presence of gears on a single face of arm 2. This arm is not in any way pierced from one end to the other and its resistance is therefore greater. Moreover the lubricating conduits do not meet the shaft and can be pierced directly in the arm for leading the lubricant from one crank pin to another. This arrangement likewise allows conserving of the same length for the last crank pin as in the case of a normal crank shaft.

It is to be understood that I may provide the gears on the other face of the arm or on the interior thereof without departing from the scope of the invention except as comprehended within the claims.

Having thus described by invention what I claim as new and desire to secure by Letters Patent is:

1. In a motor crank shaft, of one piece, having a plurality of eccentrics mounted on the cranks thereof for varying the length of strokes the eccentrics being provided on their peripheries with flanges for receiving bearing balls, the said flanges having such a diameter that the said bearings may be introduced by passing them over the elbows of the said crank shaft.

2. In a motor crank shaft having a plurality of eccentrics mounted on the crank pins thereof for varying the length of stroke, the combination of a connecting piece rigidly connected to one of the said eccentrics mounted on the crank pin, said connecting piece passing over the arm of the crank shaft which connects to the said crank pin, and means for transmitting the movement of said connecting piece to other of said eccentrics on the other of said crank pins.

3. In a motor crank shaft as set forth in claim 2, a toothed sector rigid with the connecting piece and turning on the face of the crank shaft arm opposite to the eccentric on which the connecting piece is fastened, the said toothed sector meshing with the control gearing of the eccentric on the other crank pin.

4. In a motor crank shaft as set forth in claim 2, a toothed sector rigid with the connecting piece, the said toothed sector meshing with the control gearing of the eccentric on the other crank pin a pivot for said connecting piece, the said pivot being coaxially disposed with respect to the eccentric to which the connecting piece is fastened and mounted on the face of the crank shaft arm opposite the said eccentric.

5. In a motor crank shaft as set forth in claim 2 a toothed sector rigid with the connecting piece and turning on the face of the crank shaft arm opposite to the eccentric on which the connecting piece is fastened, a pinion meshing with said toothed sector, said pinion being journalled on the same face of the said arm and meshing with the toothed control sector of the eccentric keyed on the following crank pin.

LOUIS DAMBLANC.